United States Patent
Scheibel et al.

(10) Patent No.: US 9,574,863 B2
(45) Date of Patent: Feb. 21, 2017

(54) DATUM REFERENCE FRAME FOR MECHANICAL PARTS

(71) Applicant: The Boeing Company, Chicago, IL (US)

(72) Inventors: John P. Scheibel, Florissant, MO (US); Neel P. Patel, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 652 days.

(21) Appl. No.: 14/057,293

(22) Filed: Oct. 18, 2013

(65) Prior Publication Data

US 2015/0112635 A1    Apr. 23, 2015

(51) Int. Cl.
| | |
|---|---|
| G01B 5/008 | (2006.01) |
| G01B 21/04 | (2006.01) |
| G06T 7/00 | (2006.01) |
| G06T 7/60 | (2006.01) |

(52) U.S. Cl.
CPC .............. *G01B 5/008* (2013.01); *G01B 21/04* (2013.01); *G06T 7/0042* (2013.01); *G06T 7/60* (2013.01); *G06T 2207/30164* (2013.01)

(58) Field of Classification Search
CPC ......... G01B 21/04; G01B 5/008; G01B 7/008; G06T 2207/30164; G06T 7/0042; G06T 7/60

USPC ....................... 702/95, 168; 700/98; 318/632
See application file for complete search history.

(56) References Cited

U.S. PATENT DOCUMENTS

| | | | | |
|---|---|---|---|---|
| 4,945,501 A | * | 7/1990 | Bell | ...................... G01B 21/045 318/632 |
| 2006/0106476 A1 | | 5/2006 | Tornquist et al. | |

OTHER PUBLICATIONS

ASME Y14.5M-2009 pp. 48-90.

* cited by examiner

*Primary Examiner* — John H Le
(74) *Attorney, Agent, or Firm* — Miller, Matthias & Hull LLP

(57) ABSTRACT

A method of establishing a datum reference frame for a manufactured detail part used in an assembly comprises establishing a primary datum reference plane, identifying first and second mating surfaces of the part, identifying first and second functional features of size on the first and second mating surfaces, using a coordinate measuring machine (CMM) probe to identify a first point at an intersection of a centerline of the first feature and the first surface, using the CMM probe to identify a second point at an intersection of the centerline of the second feature and the second surface; and establishing a secondary compound datum reference plane through the intersection points and perpendicular to the primary datum reference plane.

9 Claims, 4 Drawing Sheets

1

DATUM REFERENCE FRAME FOR MECHANICAL PARTS

BACKGROUND

ASME Y14.5-2009 is a standard that establishes uniform practices for stating and interpreting dimensioning, tolerancing, and related requirements for use on engineering drawings and in related documents. Section 4 of the standard relates to datum reference planes. Datums are theoretically exact points, axes, lines, and planes. A datum reference frame is formed by three mutually perpendicular intersecting datum planes. Section 4 establishes datum features for establishing relationships imposed by geometric tolerances and for constraining degrees of freedom. Section 4 also sets forth criteria for establishing datums and the datum reference frame.

Companies engaged in design and manufacture of mechanical parts utilize probes and coordinate measuring machines to perform dimensional inspection of mechanical parts. The dimensional inspection of a manufactured part includes sampling features of size on the part to establish a datum reference frame, and using the datum reference frame as the basis of measurements of the manufactured part. The datum reference frame may be used by machinists, toolmakers, and quality control inspectors to ensure that the manufactured part agrees with a product definition of the part.

Section 4 of ASME Y14.5-2009 standard does not address the situation where secondary or tertiary datum features of size are non-orthogonal to the other datum planes or non-orthogonal to other datum features. When sampling holes, for instance, an inspector makes assumptions as to where to sample the holes. These assumptions lead to ambiguity, since different inspectors make different assumptions. If datums are ambiguous, repeatability is compromised. As a result, some parts will pass inspection while identical parts will not.

SUMMARY

According to an embodiment herein, a method of establishing a datum reference frame for a manufactured detail part used in an assembly comprises establishing a primary datum reference plane, identifying first and second mating surfaces of the part, identifying first and second functional features of size on the first and second mating surfaces, using a coordinate measuring machine (CMM) probe to identify a first point at an intersection of a centerline of the first feature and the first surface, using the CMM probe to identify a second point at an intersection of the centerline of the second feature and the second surface; and establishing a secondary compound datum reference plane through the intersection points and perpendicular to the primary datum reference plane.

According to another embodiment herein, a method comprises establishing primary reference frames for a plurality of manufactured parts having a design specified in a product definition. Establishing the primary reference frame for each part includes establishing a primary datum reference plane for the part; and using a coordinate measuring machine (CMM) probe to sample first and second functional features of size on first and second mating surfaces of the part. The features and mating surfaces are specified in the product definition. Each feature is sampled at an intersection of its centerline and mating surface. Establishing the primary reference frame further includes establishing a secondary compound datum through the intersections and perpendicular to the primary datum reference plane.

According to another embodiment herein, a method comprises using a computer to establish a datum reference frame in a product definition of a detail part. Establishing the datum reference frame includes indicating target areas for a primary datum reference plane; indicating first and second mating surfaces of the part; and indicating first and second functional features of size on the first and second mating surfaces.

These features and functions may be achieved independently in various embodiments or may be combined in other embodiments. Further details of the embodiments can be seen with reference to the following description and drawings.

DETAILED DESCRIPTION

Figure 1A:
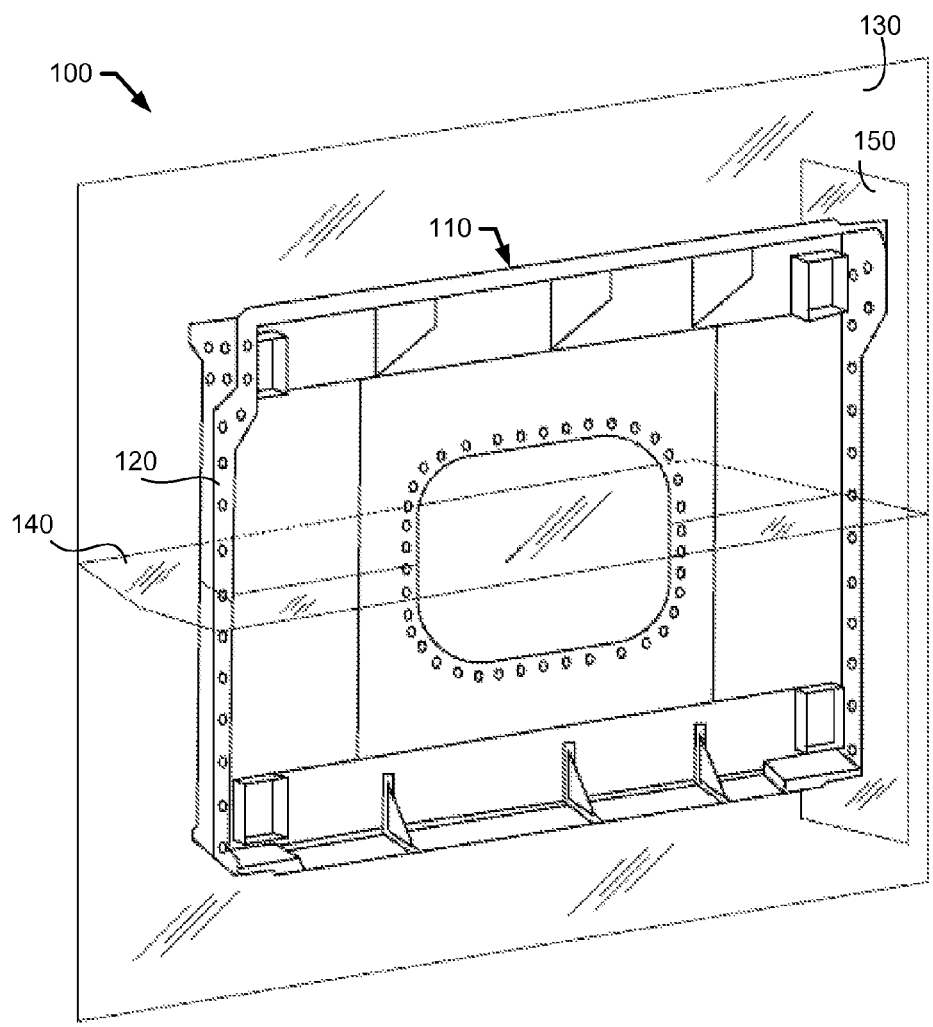
FIGS. 1A and 1B are illustrations of a product definition of a detail part used in an assembly.

Reference is made to FIG. 1A, which illustrates a product definition 100 of a detail part 110 used in an assembly. The detail part 110 will be assembled to mating parts in the assembly, wherein mating surfaces 120 of the detail part 110 will be mated with surfaces of the mating parts. The mating surfaces 120 of the detail part 110 have functional features of size that are common between mating parts at assembly level. These functional features may be regular features of size including, but are not limited to, holes, bosses, slots and tabs.

The product definition 100 also defines a datum reference frame for the detail part 110. The datum reference frame includes three mutually perpendicular intersecting datum reference planes: a primary datum reference plane 130, a secondary datum reference plane 140, and a tertiary datum reference plane 150.

The secondary datum reference plane 140 passes through two intersection points. Each intersection point lies at an intersection of a mating surface and the centerline of a functional feature of size on that mating surface.

Figure 1B:
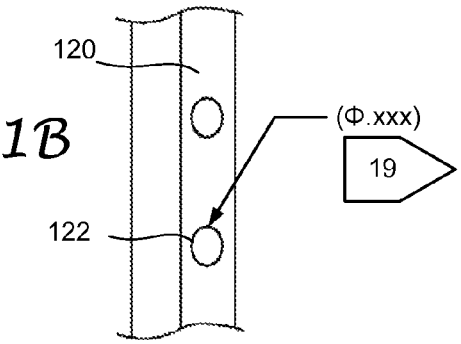

Additional reference is made to FIG. 1B. The product definition 100 may specify the mating surfaces 120 and the functional features of size that define the intersection points for the secondary datum reference plane 140. The mating surfaces 120 and functional features may be indicated by notes. For example, a leader may point to a hole 122 and one of the mating surfaces 120. Note 19 specifies that this hole 122 and mating surface establish an intersection point for the secondary datum reference plane 140.

FIG. 1A illustrates an example of a detail part. However, a detail part herein is not limited to that example.

Figure 3:
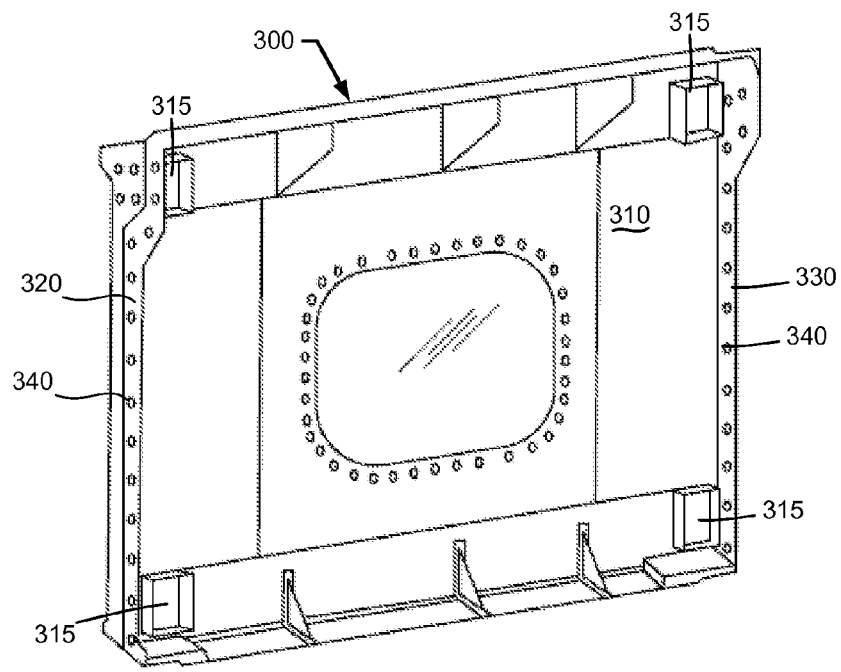
FIG. 3 is an illustration of a manufactured detail part.

Reference is now made to FIG. 3. A part 300 is manufactured from the product definition 100. The manufactured part 300 includes a web 310 and sidewalls 320 and 330. Holes 340 in the sidewalls 320 and 330 will be used to assemble the manufactured part 300 to mating parts.

Figure 2:
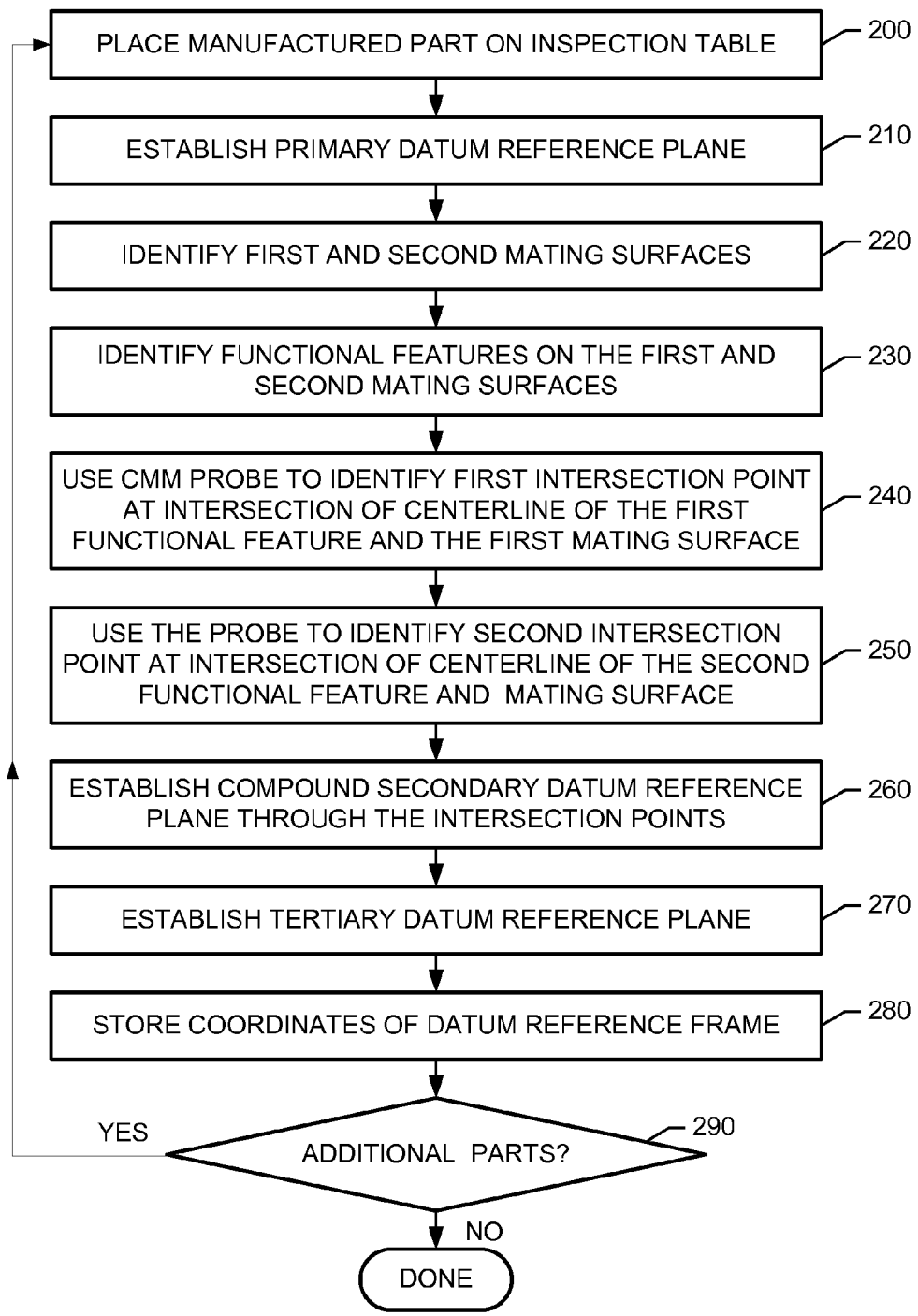
FIG. 2 is an illustration of a method of establishing a datum reference frame for a manufactured detail part.

After the part 300 has been manufactured, a datum reference frame for the manufactured part 300 is established. FIG. 2 illustrates a general method of establishing a datum reference frame for a manufactured part. The description of the general method will refer to the example of the manufactured part 300 of FIG. 3.

Reference is made to FIG. 2. At block 200, the manufactured part is placed on an inspection table.

At block 210, a primary datum reference plane for the manufactured part is established. Typically the largest or most important feature of the manufactured part is used to establish the primary datum reference plane. At least three points of contact are used between this feature and the machine table or inspection surface. For the manufactured part 300 of FIG. 3, the web 310 is the largest feature, and four target areas 315 on the web 310 may be used to establish the primary datum reference plane.

At block 220, first and second mating surfaces of the manufactured part are identified. The first and second mating surfaces may be non-orthogonal to the primary datum, non-parallel to each other, or non-planar.

At block 230, first and second functional features of size on the first and second mating surfaces are identified. The functional features of size may be non-coaxial, non perpendicular or non parallel to the primary datum reference plane; and/or non-parallel to each other. The functional features of size may include, without limitation, a hole and a boss.

For the manufactured part 300 of FIG. 3, first and second holes 340 in the sidewalls 320 and 330 are identified as the functional features that will establish the secondary datum reference plane. The mating surfaces are also identified. These mating surfaces and the holes 340 may be identified by referring to the product definition 100. Each hole 340 is perpendicular to its mating surface, but the sidewalls 320 and 330 are not perpendicular to the web 310. Therefore, the holes 340 are not parallel to the primary datum reference plane, and the holes 340 are not coaxial or parallel to each other.

At block 240, a coordinate measuring machine (CMM) probe is used to identify a first intersection point at an intersection of a centerline of the first functional feature and the first mating surface. At block 250, the CMM probe is used to identify a second intersection point at an intersection of the centerline of the second functional feature and the second mating surface.

These intersection points are not measured directly. However, they may be established by sampling at least three points on the mating surface and using standard probing methods and software to identify the hole centerline.

At block 260, a compound secondary datum reference plane is established through the two intersection points. The secondary datum reference plane is perpendicular to the primary datum reference plane. The secondary datum reference plane is "compound" because more than one functional feature is used to establish it.

Specifying each point at the intersection of a mating surface and feature centerline eliminates ambiguity. For instance, it eliminates ambiguity that would otherwise arise from establishing a point anywhere along the centerline of a non-orthogonal hole. Without this explicit method, the CMM operator would not know which functionally significant point to use to establish the datum reference frame and would be at liberty to use any point along the hole centerline.

Figure 4:
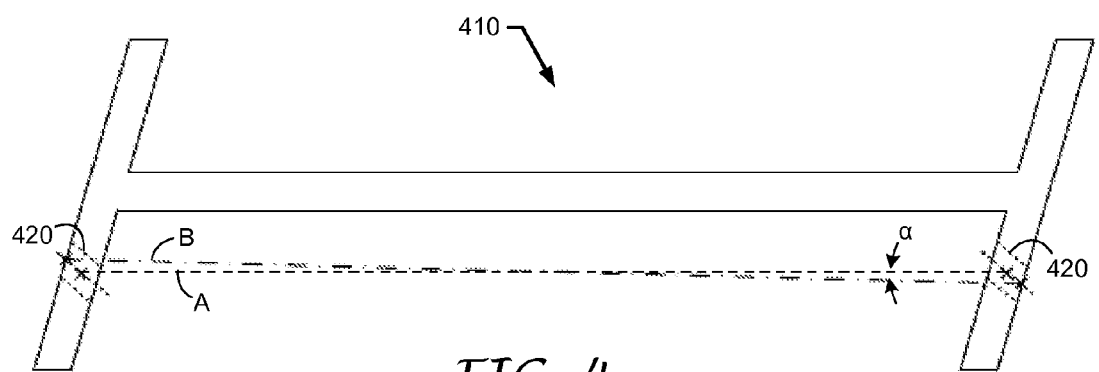
FIG. 4 is an illustration of a datum shift resulting from ambiguous datums.

FIG. 4 illustrates a datum shift resulting from such ambiguity. Consider a part 410 having mating features (holes) 420 that are not orthogonal to the primary datum reference plane and are not orthogonal to each other. The datum shift occurs because the secondary datum reference plane is not established using explicitly defined points along the axis of the holes 420. Taking measurements of the centers of the holes 420 will produce a secondary datum reference plane (A) that is different than the plane (B) resulting from measurements taken at mating surfaces of the part 410. The translational and/or angular variation of the two planes (A and B) is denoted by α. Taking measurements at other locations in the holes 420 will result in other translational angular variations α (plane A is only one of many different possibilities). By implementing the method of FIG. 2, the same set of intersection points is used from part to part, and the translational and/or angular variation α is eliminated.

Reference is once again made to FIG. 2. At block 270, a tertiary datum reference plane may be established. The tertiary datum reference plane may be established, for example, by sampling a third feature that is either non-orthogonal to the primary datum reference plane or non-orthogonal to other datum features.

At block 280, coordinates of the datum reference frame are stored. The stored datum reference frame now forms a basis of measurement for the part. The part may now be measured to ensure that it meets dimensional requirements.

At block 290, a datum reference frame for at least one other detail part is established. The functions at blocks 200-280 are repeated for each additional part. The same set of intersection points is used from part to part, and the translational and/or angular variation α is eliminated.

Figure 5:
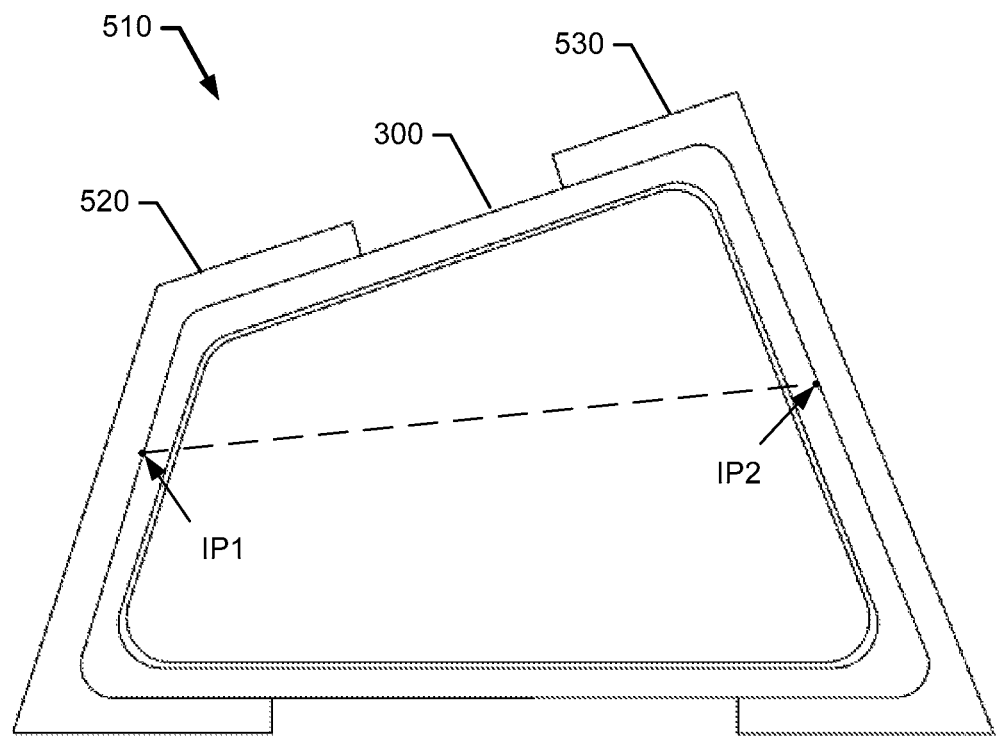
FIG. 5 is an illustration of an assembly including the manufactured detail part of FIG. 3.

Reference is now made to FIG. 5, which illustrates an assembly 510 including the manufactured part 300 and two mating parts 520 and 530. The first mating part 520 and the manufactured detail part 300 share a common intersection point (IP1) on their mating surfaces. The second mating part 530 and the manufactured detail part 300 share a common intersection point (IP2) on their mating surfaces. Thus, common intersection points (IP1 and IP2) are used to establish the secondary compound datum planes on the mating parts 520 and 530. As a result, repeatability in establishing the secondary datum plane is improved, and coordination with the mating parts is ensured.

The invention claimed is:

1. A method of establishing a datum reference frame for a manufactured detail part used in an assembly, the method comprising:

establishing a primary datum reference plane;
   identifying first and second mating surfaces of the part;
   identifying a first functional hole on the first mating surface and a second functional hole on the second mating surface;
   using a coordinate measuring machine (CMM) probe and associated software to identify a first hole center line, associated with the first functional hole, by sampling at least three first functional hole data points on the first mating surface, provided by the CMM, and using the at least three first functional hole data points to identify the hole center line;
   using the CMM probe and associated software to identify a first center point of the first functional hole at an intersection of the first centerline of the first functional hole and the first mating surface;
   using the CMM probe and associated software to identify a second hole center line, associated with the second functional hole, by sampling at least three second functional hole data points on the second mating surface, provided by the CMM, and using the at least three second functional hole data points to identify the hole center line;

using the CMM probe and the associated software to identify a second center point of the second functional hole at an intersection of the second centerline of the second functional hole and the second mating surface;

establishing a secondary compound datum reference plane through the first center point and the second center point and perpendicular to the primary datum reference plane storing the secondary compound datum reference plane as, at least part of, the datum reference frame for the manufactured detail part used in the assembly, the secondary compound datum reference plane forming, at least in part, a basis of measurement for the manufactured detail part; and measuring the manufactured detail part based, at least in part, on the stored secondary compound datum reference plane.

2. The method of claim 1, wherein the first and second functional holes are, with respect to one another, at least one of non-coaxial, non perpendicular or non parallel to the primary datum reference plane, non-parallel to each other, and any combinations thereof.

3. The method of claim 1, wherein the first and second mating surfaces are at least one of non-orthogonal to the primary datum reference plane, non-parallel to each other, non-planar with respect to one another, and any combinations thereof.

4. The method of claim 1, wherein the first and second functional holes and the first and second mating surfaces are indicated in a product definition of the part.

5. The method of claim 1, further comprising establishing a tertiary datum reference plane.

6. The method of claim 1, further comprising placing the part on an inspection table prior to using the CMM probe.

7. The method of claim 1, further comprising establishing a datum reference frame for a mating part used in the assembly, wherein a common intersection point on the mating part and the detail part are used to establish an intersection point for a secondary datum reference plane for the mating part.

8. A method for a plurality of parts having the same design, comprising performing the method of claim 1 on each part.

9. A method comprising using a computer, a CMM, and associated software to establish a datum reference frame in a product definition of a detail part in accordance with the method of claim 1.

* * * * *